(12) United States Patent
Weaver et al.

(10) Patent No.: US 8,303,676 B1
(45) Date of Patent: *Nov. 6, 2012

(54) CONVERSION OF C-O-H COMPOUNDS INTO HYDROGEN FOR POWER OR HEAT GENERATION

(75) Inventors: Samuel C. Weaver, Knoxville, TN (US); Samuel P. Weaver, Boulder, CO (US); Daniel C. Weaver, Boulder, CO (US); Daniel L. Hensley, Knoxville, TN (US)

(73) Assignee: Proton Power, Inc., Lenoir City, TN (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/430,616

(22) Filed: Apr. 27, 2009

Related U.S. Application Data

(63) Continuation-in-part of application No. 12/033,740, filed on Feb. 19, 2008.

(51) Int. Cl.
C01B 3/02 (2006.01)
C01B 3/32 (2006.01)
C10J 3/46 (2006.01)

(52) U.S. Cl. ........ 48/197 R; 423/650; 423/651; 423/652

(58) Field of Classification Search ................ 48/197 R, 48/209; 423/650, 651, 652
See application file for complete search history.

(56) References Cited

U.S. PATENT DOCUMENTS

| | | | |
|---|---|---|---|
| 3,446,609 A * | 5/1969 | Haar et al. ....................... 48/215 |
| 6,250,236 B1 | 6/2001 | Feizollahi |
| 7,105,244 B2 | 9/2006 | Kamo et al. |
| 7,132,183 B2 | 11/2006 | Galloway |
| 7,144,826 B2 | 12/2006 | Roters et al. |
| 7,192,666 B2 | 3/2007 | Calhoon |
| 7,220,502 B2 | 5/2007 | Galloway |
| 2003/0022035 A1 | 1/2003 | Galloway |
| 2004/0058207 A1 | 3/2004 | Galloway |
| 2004/0115492 A1 | 6/2004 | Galloway |
| 2007/0017864 A1 | 1/2007 | Price et al. |
| 2007/0099038 A1 | 5/2007 | Galloway |
| 2007/0099039 A1 | 5/2007 | Galloway |
| 2008/0103220 A1 | 5/2008 | Cherry et al. |

(Continued)

FOREIGN PATENT DOCUMENTS

DE 36 27 307 A1 * 2/1988

(Continued)

OTHER PUBLICATIONS

Ciferno, Jared P. et al., "Benchmarking Biomass Gasification Technologies for Fuels, Chemicals and Hydrogen Production", prepared for U.S. Department of Energy National Energy Technology Laboratory' Jun. 2002, 65 pages.

(Continued)

Primary Examiner — Timothy Vanoy
(74) Attorney, Agent, or Firm — Holland & Hart LLP

(57) ABSTRACT

Methods are disclosed for generating electrical power from a compound comprising carbon, oxygen, and hydrogen. Water is combined with the compound to produce a wet form of the compound. The wet form of the compound is transferred into a reaction processing chamber. The wet form of the compound is heated within the reaction chamber such that elements of the compound dissociate and react, with one reaction product comprising hydrogen gas. The hydrogen gas is processed to generate electrical power.

23 Claims, 6 Drawing Sheets

U.S. PATENT DOCUMENTS

2009/0158663 A1* 6/2009 Deluga et al. .................. 48/209

FOREIGN PATENT DOCUMENTS

JP 54-117504 A * 9/1979

OTHER PUBLICATIONS

Bain, R.L. et al., :"Highlights of Biopower Technical Assessment: State of the Industry and Technology", NREL—National Renewable Energy Laboratory, Golden, CO, Apr. 2003, pp. 1-47.

Restriction Requirement dated Jul. 28, 2011; U.S. Appl. No. 12/033,740; USPTO.

Restriction Requirement dated Nov. 29, 2011; U.S. Appl. No. 12/033,740; USPTO.

Office Action dated Mar. 23, 2012; U.S. Appl. No. 12/033,740; USPTO; 23 pp.

Office Action dated Jun. 15, 2012 filed in U.S. Appl. No. 12/758,355, filed Apr. 12, 2010.

* cited by examiner

CONVERSION OF C-O-H COMPOUNDS INTO HYDROGEN FOR POWER OR HEAT GENERATION

This application is a continuation-in-part of U.S. patent application Ser. No. 12/033,740, entitled "CONVERSION OF CELLULOSE INTO HYDROGEN FOR POWER GENERATION," filed Feb. 19, 2008 by Samuel C. Weaver et al., the entire disclosure of which is incorporated herein by reference for all purposes.

BACKGROUND OF THE INVENTION

This application relates generally to power generation. More specifically, this application relates to power generation through the use of C—O—H compounds for generation of hydrogen.

Extensive work has been done on conversion of cellulose, which is one example of a C—O—H compound, into ethanol (molecular formula: $C_2H_5OH$). Ethanol is known as drinking alcohol found in beverages. Ethanol is a flammable solvent and miscible with water and many organic solvents. The largest use of ethanol is as a motor fuel and fuel additive. In the United States, ethanol is most commonly blended with gasoline as a 10% ethanol blend. This blend is widely sold throughout the U.S. Midwest, and in cities required by the 1990 Clean Air Act to oxygenate their gasoline during wintertime. The energy returned on energy invested for ethanol made from corn in the U.S. is 1.34. This means that it yields 34% more energy than it takes to produce it.

There have been several methods of hydrogen extraction from cellulose ($C_6H_{10}O_5$). One of the methods is focused on using microbal bugs along with sodium hydroxide (NaOH) and a catalyst to cause a reaction that releases the hydrogen in cellulose and captures the carbon in cellulose as sodium carbonate ($Na_2CO_3$). There is still a remaining need for developing a simpler and cost effective way of generating hydrogen gas from C—O—H compounds more generally, and in a fashion that allows efficient power generation from the reaction-product hydrogen gas.

While various power and heat generation techniques exist in the art, there is still a general need for the development of alternative techniques for generating power. This need is driven at least in part by the wide variety of applications that make use of power generation, some of which have significantly different operation considerations than others.

BRIEF SUMMARY OF THE INVENTION

Embodiments of the invention provide methods for generating electrical power from a compound comprising carbon, oxygen, and hydrogen. Water is combined with the compound to produce a wet form of the compound. The wet form of the compound is transferred into a reaction processing chamber. The wet form of the compound is heated within the reaction chamber such that elements comprised by the wet form of the compound dissociate and react, with one reaction product comprising hydrogen gas. The hydrogen gas is processed to generate electrical power or heat.

The compound may consist of carbon, oxygen, and hydrogen in some embodiments. In specific embodiments, the compound comprises cellulose or comprises lignin. The water may comprise liquid water.

A flow of inert gas, such as oxygen or nitrogen, may sometimes be provided to the reaction chamber. A typical temperature to which the compound is headed is between 700° C. and 1100° C.

In some embodiments, processing the hydrogen gas comprises burning the hydrogen gas, while in other embodiments, processing the hydrogen gas comprises feeding the hydrogen gas into a fuel cell. In some instances, processing the hydrogen gas may comprise passing reaction-product gases through a reduced-pressure chamber to remove traces of unreacted carbon. In other instances, processing the hydrogen gas may comprise passing reaction-product gases through a water-cooled chamber to remove unreacted water.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and drawings.

DETAILED DESCRIPTION OF THE INVENTION

Figure 1A:
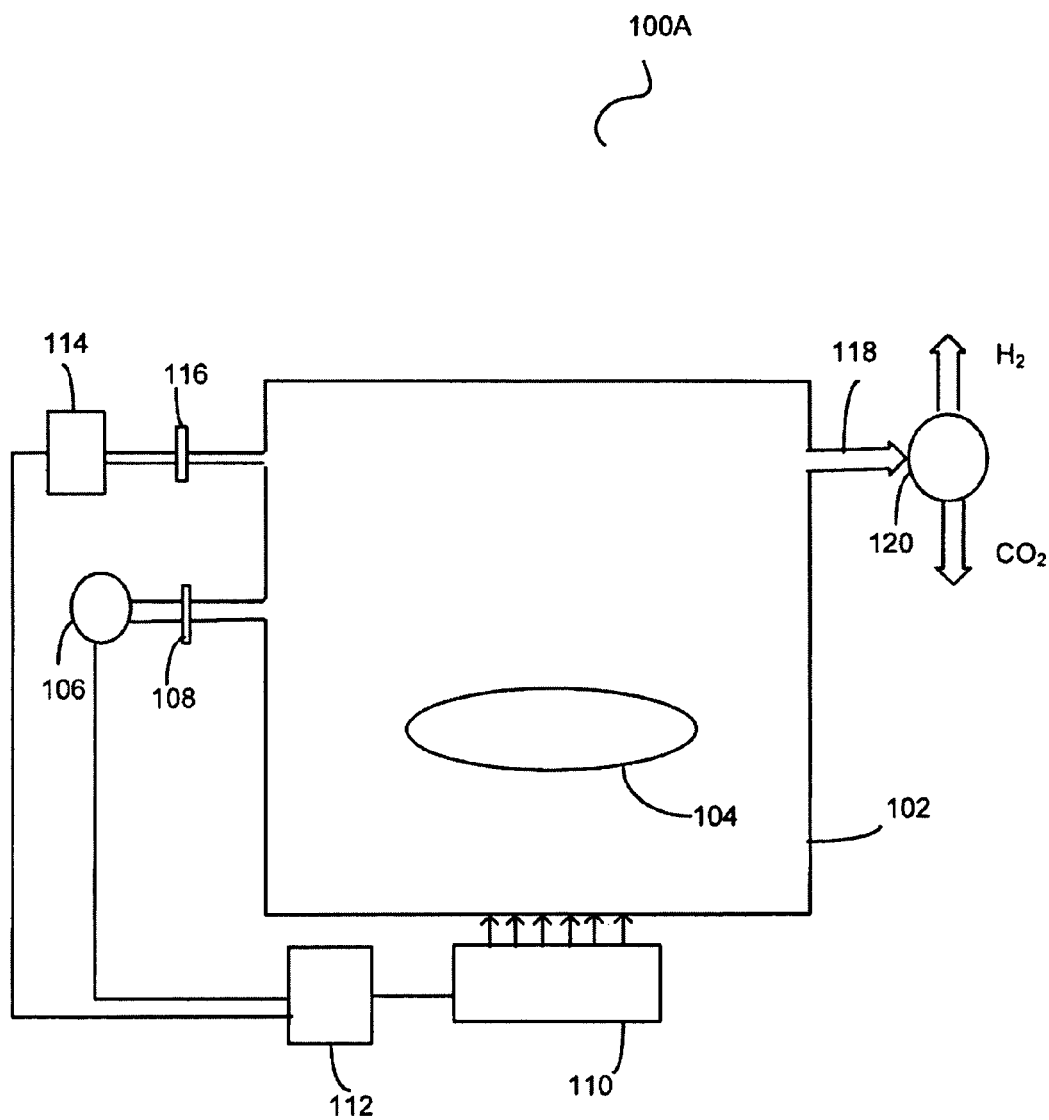
FIG. 1A is a schematic diagram of a simplified system for conversion of C—O—H compounds into hydrogen.

Merely for purposes of illustration, certain specific reactions involving cellulose are described herein as an example of how the methods and processes disclosed may be implemented. The techniques have been found by the inventors, however, to be readily applicable more generally to C—O—H compounds and illustrations using cellulose are not intended in any way to limit the scope of the invention.

Reaction 1 of Conversion of Cellulose into Hydrogen

Cellulose has a molecular formula of $C_6H_{10}O_5$. One possible reaction is that cellulose is disassociated in inert gas upon heating to release $H_2O$ and to generate carbon residue. The reaction may be described by:

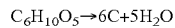
$$C_6H_{10}O_5 \rightarrow 6C + 5H_2O$$

However, this is different from the inventor's discovery. The inventor previously studied carbonizing cotton for production of carbon fiber. When started, about 15 kg of cotton was used in burning. When the burning ended, about 3 kg of the carbonized cotton was left. It was puzzling that the average yield of the carbon content was 20%-25% at the time of the experiment.

A further understanding of this observation in this experiment leads to the present invention. If the carbon consumes all the oxygen in the cellulose to form carbon dioxide ($CO_2$), the reaction may be described by:

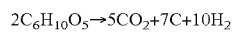
$$2C_6H_{10}O_5 \rightarrow 5CO_2 + 7C + 10H_2$$

Hence, the remaining carbon may be calculated by using molecular weight as follows:

(7 moles×$M_r$ of carbon)/(2 moles×$M_r$ of cellulose)= (7×12)/(2×162)=26%.

In addition, if the carbon consumes all the oxygen in the cellulose to form carbon monoxide (CO), the reaction may be defined by:

$$C_6H_{10}O_5 \rightarrow 5CO+C+5H_2$$

the remaining carbon may be estimated as below:

$M_r$ of carbon/$M_r$ of cellulose=12/162=7%

Therefore, it is likely that the dominant reaction during cellulose burning may result in a mixture of CO and $CO_2$, with $CO_2$ dominant in the mixture. Hence, cellulose heated in an inert gas may result in the following chemical reaction:

$$2C_6H_{10}O_5 \rightarrow 5CO_2+7C+10H_2 \quad \text{(Reaction 1a)}$$

Additional reactions for hydrogen to be burned in oxygen to form water and for carbon to be burned in oxygen to form carbon dioxide are defined as below:

$$2H_2+O_2 \rightarrow 2H_2O \quad \text{(Reaction 1b)}$$

$$C+O_2 \rightarrow CO_2 \quad \text{(Reaction 1c)}$$

Thermochemistry is a study of energy changes that occur during chemical reactions. If energy is transferred as heat at constant volume, and no work is done, the change of internal energy produced is equal to the heat transferred. For a specified change of state $\Delta U$ independent of any process, $(\Delta U)_v=q_v$ defined by the first law of thermodynamics. If energy is transferred as heat at constant pressure, the quantity of energy transferred can be identified with a change of enthalpy. Therefore, as long as no other work is being done, $\Delta H=q_p$. The enthalpy change accompanying a reaction is called the reaction enthalpy ($\Delta H$). An enthalpy of formation is the reaction enthalpy when a compound is formed from its elements. For a reaction with several reactants and products, the enthalpy change $\Delta H$ refers to the overall process as follows:

(unmixed reactants)→(unmixed products)

The reaction for which $\Delta H>0$ are called endothermic; those for which $\Delta H<0$ are called exothermic.

Table 1 lists the enthalpy of formation for compounds such as carbon dioxide ($CO_2$), water ($H_2O$), and cellulose ($C_6H_{10}O_5$) and the molecular weight per mole of the compounds. It also lists the specific heat of the compounds and enthalpy of vaporization of water. Such data provided in the table are used for calculations of the energy required to heat cellulose and to form water vapor at elevated temperatures.

TABLE 1

|  | Enthalpy of Formation (kJ/mol) | Molecular Weight (gram/mol) | Specific Heat $C_p$ (J/K/mol) | Enthalpy of Vaporization (kJ/mol) |
|---|---|---|---|---|
| $CO_2$ | −393.5 | 44 | — | — |
| $H_2O$ (g) | −241.8 | 18 | 33.58 | — |
| $H_2O$ (l) | −285.8 | 18 | 75.29 | 40.7 |
| Cellulose ($C_6H_{10}O_5$) | −87.2 | 162 | 230 | — |

Referring to reaction 1a now, by using the enthalpy of formation, the energy release for 2 moles of cellulose is estimated to be as follows:

$\Delta H1=5(-393.5)-2(87.2)=-2141.8$ kJ

If the remaining hydrogen is burned to form water in Reaction 1b, additional energy released for 2 moles of cellulose is calculated as:

$\Delta H2=10(-241.8)=-2418.3$ kJ

Therefore, the energy release for 2 moles of cellulose is:

$\Delta H=\Delta H1+\Delta H2=-4560.1$ kJ

The energy release for 1 mole of cellulose in reactions 1a and 1b is thus −2280 kJ/mol.

If it requires an energy of 92 kJ/mol to heat cellulose, as this is calculated by the specific heat $C_p$ and temperature change for cellulose using the following equation:

$\Delta U=C_p\Delta T=230$ J/K/mol*400K=92,000 J/mol=92 kJ/mol

Then, the net energy release for cellulose to be burned in inert gas is:

$\Delta H3=-2280+92=-2188$ kJ/mol=−2188/162 kJ/g=−13.51 kJ/g

In addition, the residue of 3.5 moles of carbon (or 3.5*12=42 grams of carbon) for a mole of cellulose may be potentially burned to form carbon dioxide and to release additional energy that is:

$\Delta H4=-3.5*393.5=-1377.3$ kJ/mol=−1377.3/162 kJ/g=−8.5 kJ/g

The total energy release for cellulose is estimated by:

$\Delta H4+\Delta H3=-13.51-8.5=-22.0$ kJ/g

The inventor has performed experiments by using nitrogen gas instead of argon to displace air, because nitrogen gas costs less than argon gas. However, the average yield of carbon is dropped to 17% from 20-25% when gas is switched from argon to nitrogen, which may be due to the formation of CN, or perhaps nitrogen may not displace oxygen as well as argon gas.

Reaction 2 of Conversion of Cellulose into Hydrogen

Another possible reaction for conversion of cellulose into hydrogen is an extension of an old "water gas" technique. In the early days of gas lighting, water gas was generated for street lights and home use. At one time, about 50,000 companies in the U.S.A. were in the business of generating the water gas. The water gas reaction uses charcoal and water to generate hydrogen gas as follows:

$$C+H_2O \rightarrow CO+H_2$$

When the charcoal is heated to about 400° C., water is added to the charcoal. The reaction of the charcoal and water steam generates carbon monoxide (CO) and hydrogen ($H_2$). When both CO and $H_2$ are burned in the presence of oxygen ($O_2$), a large amount of heat is released along with the formation of $CO_2$ and $H_2O$. However, the net energy generated from this reaction is about equal to that generated from burning carbon. This reaction is still used today, but not frequently, as natural gas replaces it as a cheaper way to provide gas use.

A possible reaction for generating hydrogen from cellulose by adding water gas is defined by:

$$C_6H_{10}O_5+7H_2O \rightarrow 6CO_2+12H_2 \quad \text{(Reaction 2a)}$$

Hydrogen may be burned in oxygen defined by:

$$2H_2+O_2 \rightarrow 2H_2O \quad \text{(Reaction 2b)}$$

In reaction 2a, the energy release is:

$\Delta H=6(-393.5)-87.2-7(-241.8)=-755$ kJ/mol

Also, for 7 moles of water in the form of liquid to be changed to water vapor at 400° C., a heat absorption of 495 kJ/mol is required. This energy includes the heat of vaporization to convert water from liquid to vapor, the heat required for the temperature changes in both liquid and gas forms of water as estimated by:

$$\Delta U = 7(40.7 + 75.29(75)/1000 + 33.58(300)/1000) = 395 \text{ kJ/mol}$$

Hence, this heat $\Delta U$ added to the energy for heating up 1 mole of cellulose (92 kJ/mol) gives a total heat required, i.e. 395 kJ/mol+92 kJ/mol=487 kJ/mol. Therefore, this reaction has a net energy release (−755 kJ/mol+487 kJ/mol=−322 kJ/mol or 1.99 kJ/g) assuming no energy loss in the process.

However, when the hydrogen is burned in the presence of oxygen, the following energy is released for 1 mole of cellulose:

$$\Delta H = 12(-241.8) = -2902 \text{ kJ/mole} = -(2902/162) \text{ kJ/g} = -17.9 \text{ kJ/g}$$

The total energy release from the two reactions is: −1.99 kJ/g−17.9 kJ/g=−19.9 kJ/g.

Systems for Conversion of C—O—H Compounds into Hydrogen and Electrical Power or Heat Generation A general overview of a simplified system 100A for conversion of a C—O—H compound into hydrogen is provided with FIG. 1A. The system 100A comprises a chamber 102, a heating system 110 in a thermal communication with the chamber 102, a gas supply line 114 for providing inert gas into the chamber 102, a water supply line 106 for water to be added to the chamber 102, an exhaust line 118 to allow the product gases (such as $H_2$ and $CO_2$, depending on the specific compound(s) used) to exit the chamber 102 to flow into a gas separator 120, and a controller 112. The C—O—H compound 104 is disposed within the chamber 102. Examples of C—O—H compounds that the inventors have found suitable for the methods of the invention include sources of cellulose and/or sources of lignin. As described further below, some processes may use an inert gas, and the controller 112 controls when to flush the chamber 102 with inert gas by using a valve 116. The controller 112 also controls the heating system 110 to provide the elevated temperatures that the chamber needs to cause the C—O—H compound 104 to be dissociated in the environment within the chamber 102. The controller 112 also controls when water is added into the chamber 102 and the amount of water needed for reacting the C—O—H compound 104 and water. The controller 112 further controls the temperature of the heating system 110 to provide water vapor and to heat the C—O—H compound 104 to cause the chemical reaction of the C—O—H compound 104 with water. The gas separator 120 is to separate the products of the reaction (e.g., $H_2$ and $CO_2$ gases and perhaps other reaction products) after the gases ($H_2$, $CO_2$) exit the chamber 102. The hydrogen gas can then be further used to generate electrical power or heat by different systems. In a specific embodiment of the invention, the gas supply line 114 for providing inert gas is not present. In such a case, air inside the chamber 102 reacts with the C—O—H compound to produce water and carbon dioxide until the air is depleted.

Technique for hydrogen burning to generate power and/or heat are known in the art. The entire contents of a U.S. Pat. No. 7,144,826 B2, entitled "Method and Apparatus for the Production of Process Gas That includes Water Vapor and Hydrogen Formed by Burning Oxygen in a Hydrogen-Rich Environment" by George Roters, Helmut Sommer, Genrih Erlikh, and Yehuda Pashut, are incorporated herein by reference for all purposes.

Figure 1B:
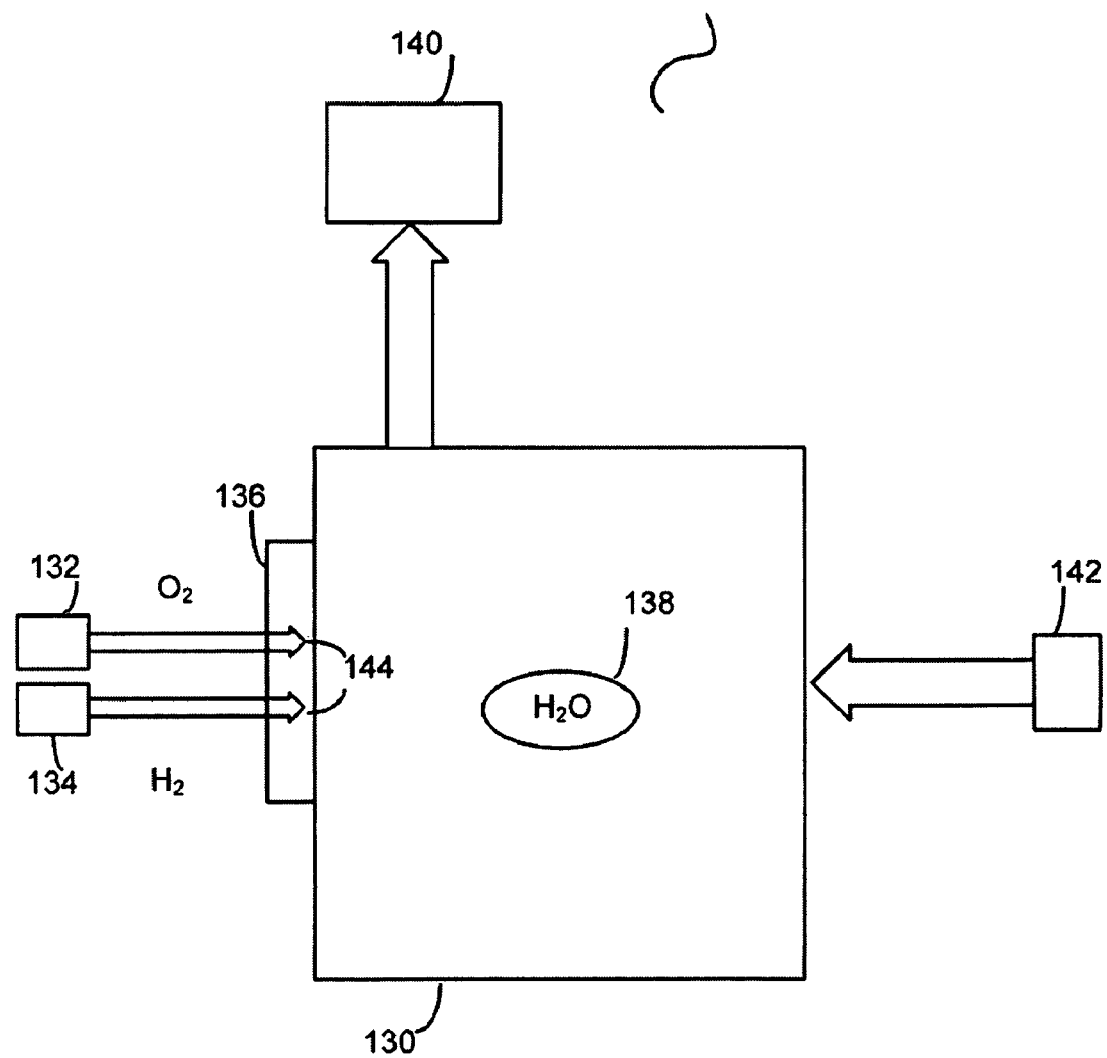
FIG. 1B is a schematic diagram of a simplified system for hydrogen to be burned in a combustion chamber.

For illustration purposes, a simplified exemplary system 100B for hydrogen burn is provided in FIG. 1B. The system 100B comprises a combustion chamber 130, a burner 136 for igniting hydrogen burning in oxygen to form water vapor 138 and generate heat, a $H_2$ gas supply line for providing $H_2$ into the combustion chamber 130, a gas supply line for providing $O_2$ into the combustion chamber 130, an exhaust line 140 for water vapor steam 138 to exit the combustion chamber 130, and an inert gas supply line 142 for providing inert gas to flush the combustion chamber prior to introducing $H_2$ gas to the combustion chamber 130 in embodiments where such inert gas is used. The ratio of hydrogen gas 132 and oxygen gas 134 is provided such that hydrogen may be thoroughly burned in oxygen. The water vapor 138 may be converted into electrical power in the converter 140 by any of several techniques known in the art. In general, instead of oxygen, an oxygen-containing gas, such as, among others, NO or $O_3$, can be used. As noted, in specific embodiments of the invention, the gas supply line 142 for providing inert gas is not present. In such a case, air inside the chamber 130 reacts with the C—O—H compound to produce water and carbon dioxide until the air is depleted.

After the combustion chamber is filled with hydrogen 132, the heating system 136 is activated and now oxygen 134 is introduced into the chamber. In the combustion chamber 130, the oxygen 134 is introduced, for example, with a time delay of five seconds relative to hydrogen 132. The heating system 136 heats the region near the outlet 144 to about 700° C. to ignite the combustion. The ratio of the oxygen 134 to the hydrogen 132 is provided into the combustion chamber so that the hydrogen is completely burned.

Another method of conversion of hydrogen into electrical power is using a fuel cell. A fuel cell is an electrochemical energy conversion device. It transforms chemical power into electrical power. A fuel cell can convert hydrogen and oxygen into water and produce electricity and heat. A fuel cell can also use other fuel sources than hydrogen gas, such as liquid fuel like methanol, natural gas, gasoline, and the like. A fuel cell power generation equipment comprises an anode, an electrolyte membrane, a cathode and a diffusion layer, wherein fuel is oxidized at an anode and oxygen is reduced at a cathode, such as described in U.S. Pat. No. 7,192,666 B2, entitled "Apparatus and Method for Heating Fuel Cells" by John C. Calhoon, the entire contents of which are incorporated herein by reference for all purposes.

Figure 1C:
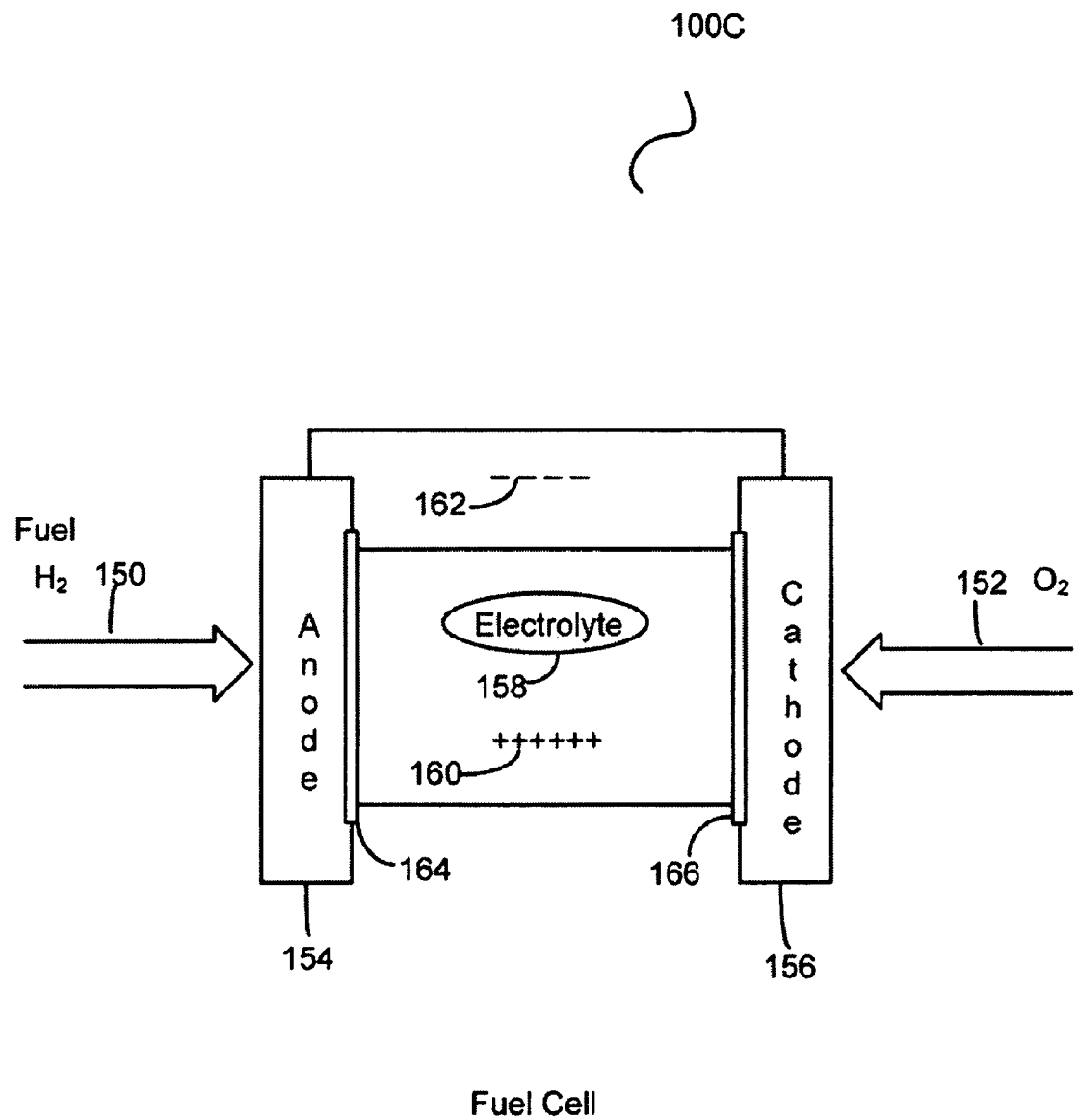
FIG. 1C is a schematic diagram of a simplified system for conversion of hydrogen gas into electrical power by a fuel cell.

FIG. 1C shows a simplified fuel cell system 100C for using $H_2$ gas as fuel. The system 100C comprises an anode 154, and a cathode 156, an electrolyte 158, a hydrogen gas 150 supply line, and an oxygen gas 152 supply line. Hydrogen 150 from the gas supply line is fed to the anode 154 of the fuel cell, while oxygen 152 from the gas supply line is fed to the cathode 156 of the fuel cell. The hydrogen 100 atoms reacting with a catalyst 164 in the anode 154, are split into protons 160 and electrons 162. Meanwhile, an oxygen molecule 152 reacting with a catalyst 166 in the cathode 156, is split into two separate oxygen atoms bearing negative charges.

The electrolyte 158 is positioned between the anode 154 and the cathode 156. The electrolyte 158 functions as a conductor for carrying protons 160 between the anode 154 and the cathode 156. The protons 160 are permitted to pass through the electrolyte while the electrons 162 are not. The protons 160 pass through the electrolyte 158 towards the oxygen 152 in the cathode 156. The result is a build up of negative charge in the anode 154 due to that the electrons 162 are left behind. The electrical potential generated by the buildup of electrons 162 is used to supply electrical power. Meanwhile, the protons diffuse through the membrane (electrolyte) to the cathode, where a hydrogen atom is recombined at the cathode and reacted with oxygen to form water at the cathode.

There are many types of fuel cells for converting hydrogen and oxygen into water and generating electricity, for instance, among others, phosphoric acid fuel cell (PAFC), Proton Exchange Membrane (PEM), Molten Carnoate Fuel Cell (MCFC), Solid Oxide Fuel Cell (SOFC), and Alkaline Fuel Cell (AFC). The efficiencies vary from various fuel cells, ranging from 30% to 85%.

The chemical reactions also vary from fuel cells. For example, the chemical equations for describing the PEM reactions in the anode, cathode, and the fuel cell are provided as follows:

Anode: $H_2 (g) \rightarrow 2H^+ (aq) + 2e^-$

Cathode: $\frac{1}{2}O_2 (g) + 2H^+ (aq) + 2e^- \rightarrow H_2O (l)$

Fuel Cell: $H_2 (g) + \frac{1}{2}O_2 (g) \rightarrow H_2O (l)$

Another example of the chemical reactions for describing the PAFC reactions is provided below:

Anode: $H_2 (g) \rightarrow 2H^+ (aq) + 2e^-$

Cathode: $\frac{1}{2}O_2 (g) + 2H^+ (aq) + 2e^- \rightarrow H_2O (l)$

Fuel Cell: $H_2 (g) + \frac{1}{2}O_2 (g) + CO_2 \rightarrow H_2O (l) + CO_2$

Note that PAFCs can tolerate a low concentration of $CO_2$ of about 1.5%, which allows a broad selection of acceptable hydrogen fuels.

Processes for Conversion of Hydrogen into Electrical Power

Figure 2:
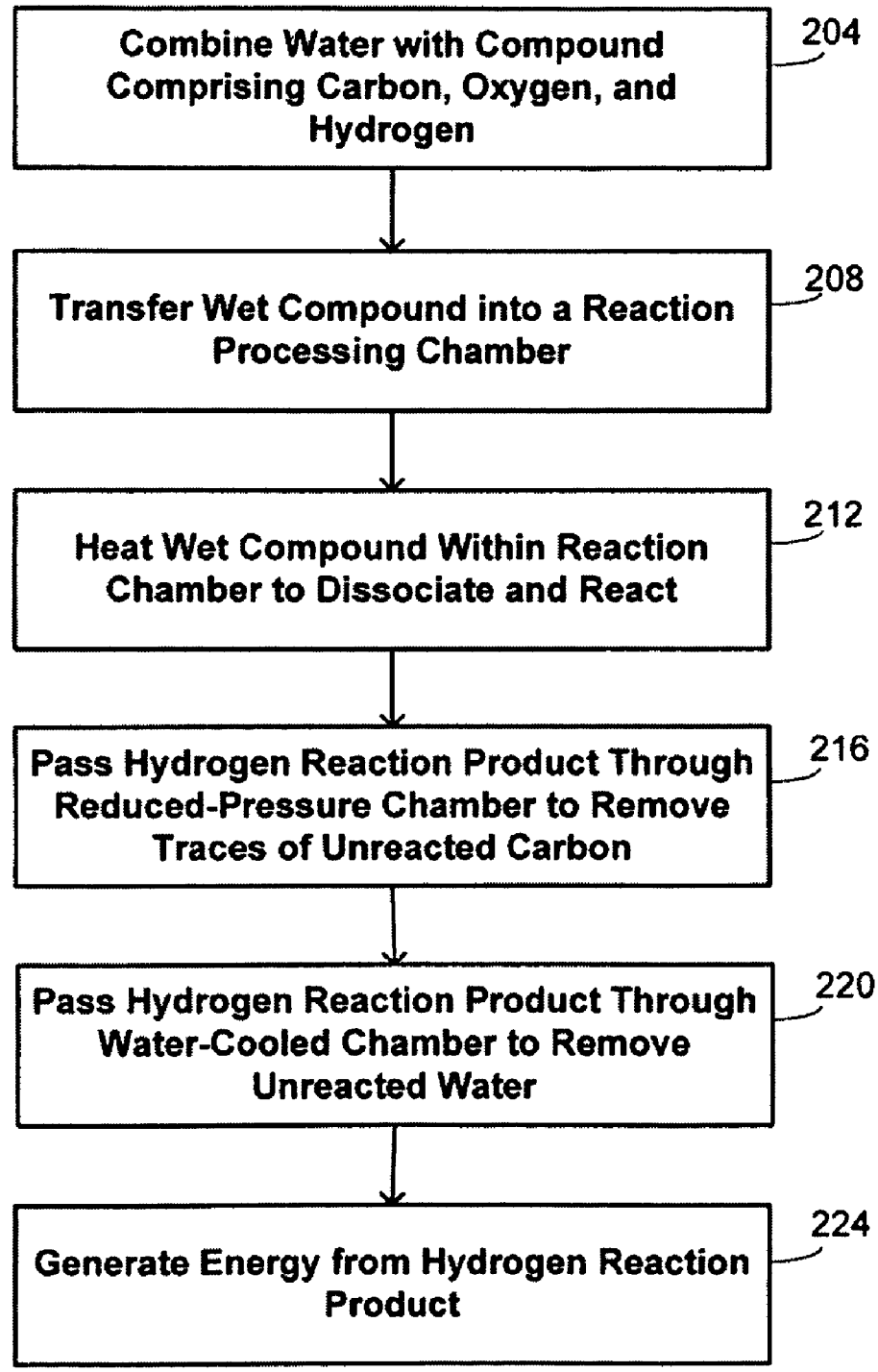
FIG. 2 is a flow diagram that summarizes general aspects of methods for converting C—O—H compounds into hydrogen for power generation.

FIG. 2 provides an overview of methods that may be used for conversion of the C—O—H compound into hydrogen for power generation. In FIG. 2 and in the other flow diagrams, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 204 of FIG. 2, water is combined with the C—O—H compound, examples of which include cellulose and/or lignin. The wet compound in transferred into a reaction processing chamber at block 208. These two steps provide one example of steps whose order may be changed in alternative embodiments. For example, the compound may be disposed in the reaction processing chamber in a dry state, with the "transfer" effected by combining it with water while disposed there. In still other instances, water may be applied to the compound as it is moved into the reaction processing chamber, such as by using a spray system, as part of the transfer.

At block 212, the wet compound is heated within the reaction chamber. Such heating may be accomplished using a variety of different techniques known to those of skill in the art, some of which have been described above for specific structural embodiments. In some instances, the compound is heated to a temperature between 700° C. and 1100° C. although other temperatures are known by the inventors also to be effective. Heating the wet compound causes dissociation and reaction of the dissociated elements, with typical reaction products including molecular hydrogen $H_2$ and carbon dioxide $CO_2$. Molecular hydrogen produced within the reaction chamber is processed at blocks 216-224, although not all of these steps need be included in many embodiments.

In particular, it is not expected that the production of hydrogen will be 100% and there may be traces of unreacted elements remaining in the reaction products. For example, passing the hydrogen reaction product through a reduced-pressure chamber at block 216 may be useful in removing traces of unreacted carbon and passing the hydrogen reaction product through a water-cooled chamber at block 220 may be useful in removing unreacted water.

Once the hydrogen has been extracted from the process, it may be processed at block 224 to generate energy, such as by using a burning process or a fuel-cell process as described above.

Figure 3:
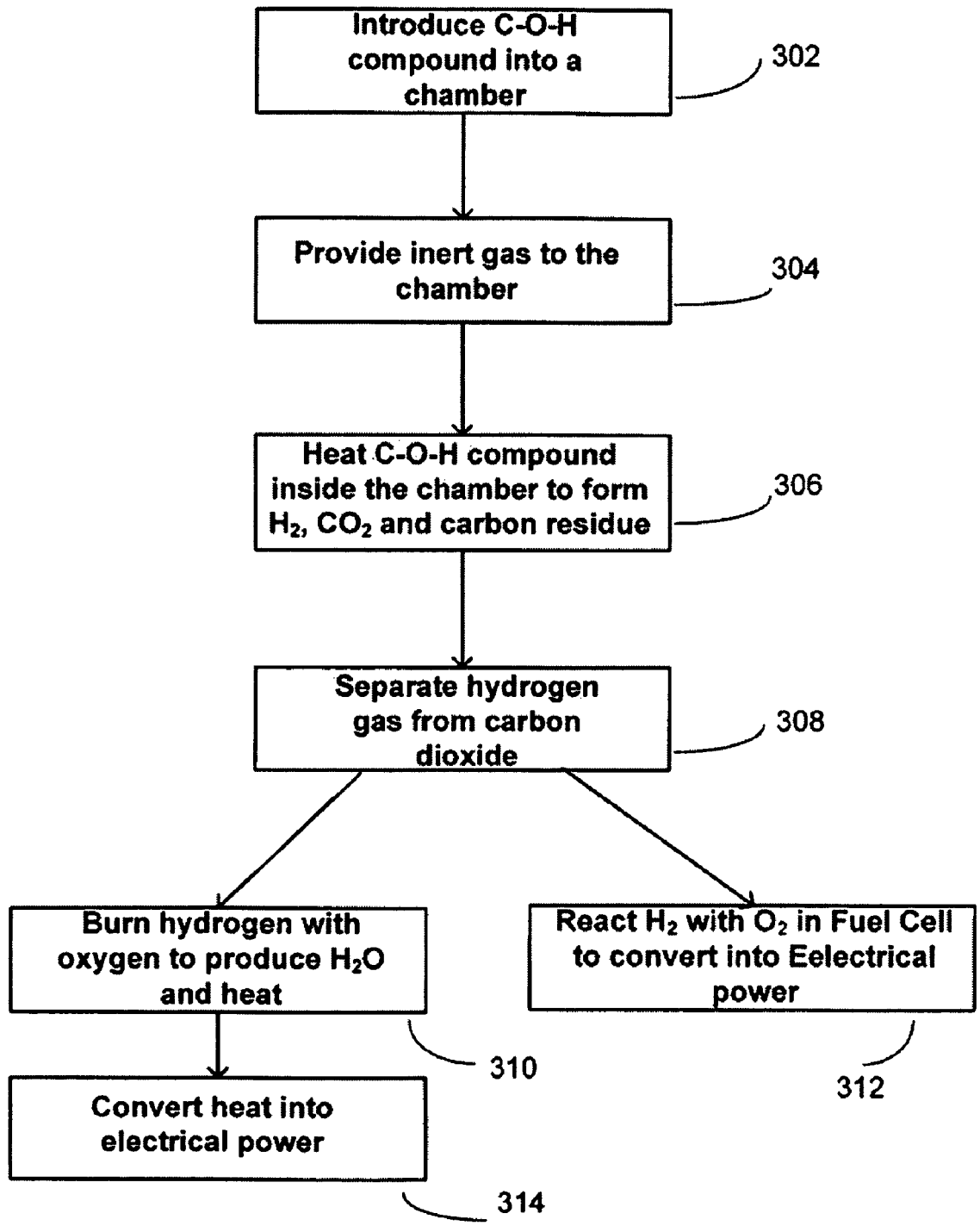
FIG. 3 is a flow diagram that summarizes a first specific method of conversion of cellulose into hydrogen and steps of conversion of hydrogen into electrical power.
Figure 4:
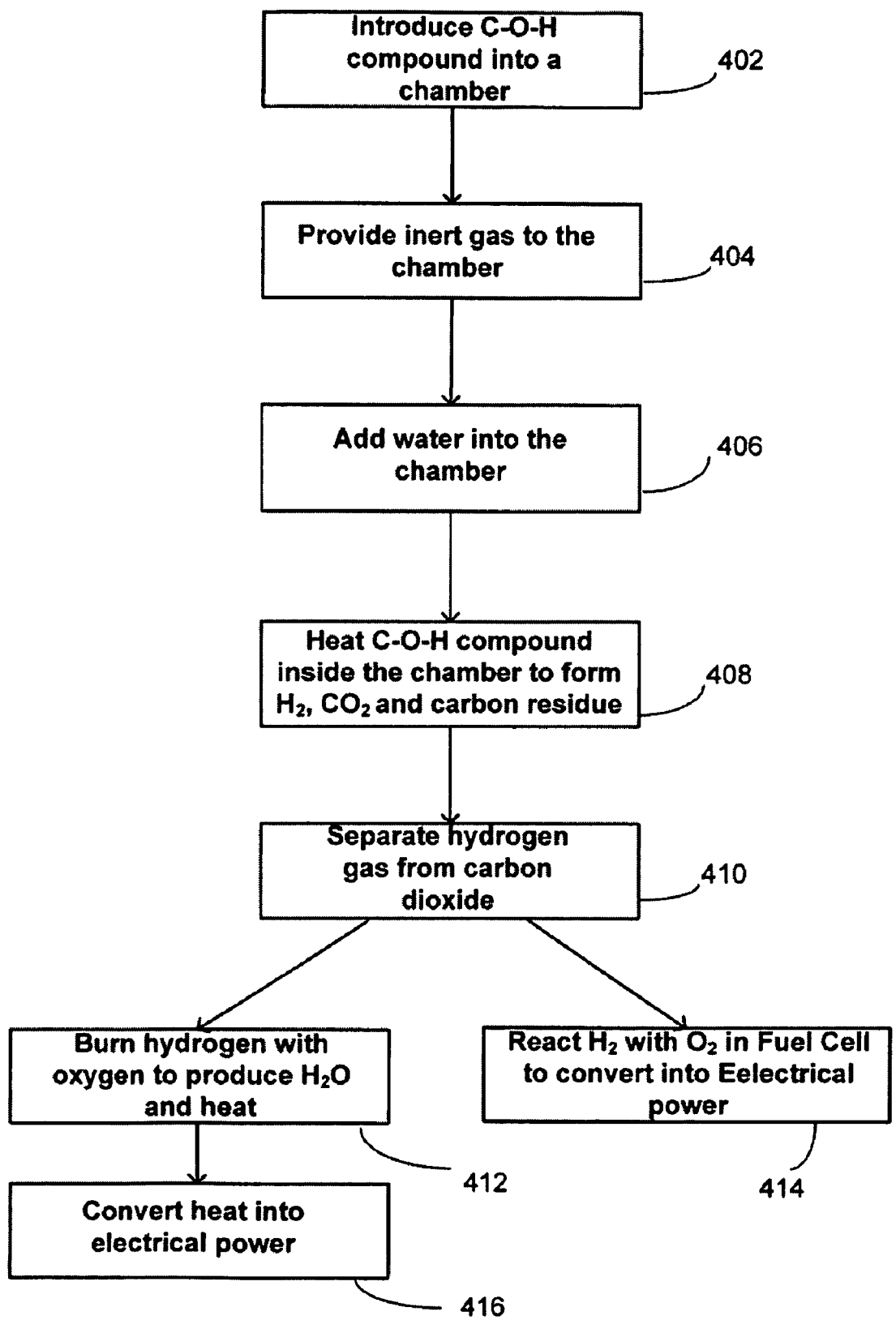
FIG. 4 is a flow diagram that summarizes a second specific method of conversion of cellulose into hydrogen and steps of conversion of hydrogen into electrical power.

FIGS. 3 and 4 provide more specific illustrations of methods of the invention for particular embodiments. For example, FIG. 3 is a flow diagram that summarizes a first method of conversion of a source of C—O—H compound such as cellulose or lignin into hydrogen from reaction 1a and then steps for conversion of hydrogen into electrical power. The process starts at block 302 by introducing the source of C—O—H compound into a chamber. The chamber is then flushed with inert gas to displace air in the chamber at block 304. The inert gas may comprise argon, nitrogen, helium, and the like. In a specific embodiment of the invention, no inert gas is introduced into the chamber so that the chamber is filled with air. The air reacts with the C—O—H compound until the air is depleted inside the chamber. The chamber containing the source of C—O—H compound is heated to cause dissociation of the C—O—H compound at block 306. The dissociation results in forming hydrogen gas, carbon dioxide, and carbon residue. The hydrogen gas is separated from the carbon dioxide gas at block 308 by techniques known in the art. The diagram shows two possible ways of conversion of hydrogen into electrical power. One way of conversion of hydrogen into electricity is to react hydrogen with oxygen in a fuel cell at bock 312. Another way of conversion of hydrogen into electrical power is to burn hydrogen gas in oxygen in a combustion chamber at block 310, so that water vapor is formed along with heat release. The water vapor is then fed into an energy converter for producing electricity from thermal energy by techniques known in the art.

FIG. 4 is a flow diagram that summarizes a second method of conversion of a source of C—O—H compound into hydrogen from reaction 2a and steps for conversion of hydrogen into electrical power. The process starts at block 402 by introducing the source of C—O—H compound into a chamber. The chamber is then flushed with inert gas to displace air in the chamber at block 404. The inert gas may comprise argon, nitrogen, helium, and the like. In a specific embodiment of the invention, no inert gas is introduced into the chamber so that the chamber is filled with air. The air reacts with cellulose until the air is depleted inside the chamber.

Water is then added into the chamber at block 406, as water is needed to react with the C—O—H compound to form hydrogen and carbon dioxide. The water in the form of liquid is heated to be changed to water vapor, and the chamber containing the source of C—O—H compound is heated to a temperature at which the C—O—H compound may react with the water vapor at block 408. The reaction of C—O—H compound and water results in forming a hydrogen gas and a carbon dioxide gas. The hydrogen gas needs to be separated from the carbon dioxide gas at block 410 by techniques known in the art.

The diagram shows two possible ways of conversion of hydrogen into electrical power. One way of conversion of hydrogen into electricity is to react hydrogen with oxygen in a fuel cell at bock 414. Another way of conversion of hydrogen into electrical power is to burn hydrogen gas in oxygen in a combustion chamber at block 412, so that water vapor is formed along with heat release. The water vapor is then fed into an energy converter for producing electricity from thermal energy by techniques known in the art.

Economical Significance of Reaction 1a and 1b for Electrical Power Generation

The present invention may have potential application, such as use as a replacement of gasoline to run automobiles. For example, the reactions 1a and 1b may be used to run an engine. If corn is used as a source of cellulose, and it costs approximately $0.142/kg. Since 1 mole of corn (i.e. 162 g of corn) produces 5 moles of hydrogen (i.e. 10 g of hydrogen) in reaction 1a, the raw material cost for hydrogen is estimated to be $2.30/kg by the following calculation:

($0.142/kg cellulose)×(162 kg cellulose)/(10 kg $H_2$)=$2.30/kg $H_2$

For a 30% efficiency of conversion of the heat released during the chemical reaction to electrical power, this process of using corn for electrical power generation may cost $0.23/kW-hr, which is estimated as the following:
1 kg $H_2$ generates 33.6 kW-hr of heat when burned to form water in reaction 1b, this is calculated by:

1 kg $H_2$/(2 g/mol $H_2$)=500 mol/kg $H_2$;

3600 kJ=1 kW-hr;

(500 mol/kg $H_2$)×(241.8 kJ/mol $H_2O$)/(3600 kJ/(1 kW-hr))=33.6 kW-hr/kg $H_2$;

($2.30/kg $H_2$)/(33.6 kW-hr/kg $H_2$)/(0.3)=$0.23/kW-hr

It is likely that the cost of cellulose is much less than that of corn. If the cost of cellulose is reduced to half, the electrical power cost may be reduced to $0.115/kW-hr, which is competitive with the current electrical power cost.

Economical Significance of Reactions 2a and 2b for Electrical Power Generation

The reactions 2a and 2b may be used to run an engine. Again, when corn is used as a source of cellulose, and it costs about $0.142/kg. For every 1 mole (162 g) of cellulose, 12 moles (24 g) of hydrogen is produced from Reaction 2a. Hence, this converts to a cost of $0.96/kg hydrogen, which is estimated by the following calculation:

($0.142/kg cellulose)×(162 kg cellulose)/(24 kg $H_2$)=$0.96/kg $H_2$.

For a 30% efficiency for conversion of heat into electrical power, the electrical power may cost $0.095/kW-hr as calculated by:

($0.96/kg $H_2$)/(33.6 kW-hr)/kg $H_2$)/(0.3)=$0.095/kW-hr.

It is known that cellulose in corn stalks makes up 55% of the overall weight of the corn, but the corn stalks cost less than corn. This may reduce the electrical power cost to a range of $0.04/kW-hr. Hence, Reactions 2a and 2b may be more cost effective than Reactions 1a and 1b if only hydrogen burning is considered without burning residual carbon obtained in Reaction 1a. Since in Reaction 1a, for every 1 mole of cellulose, 5 moles of hydrogen are generated. However, in Reaction 2a, for every 1 mole of cellulose, 12 moles of hydrogen are generated.

Potential Application in Automotives

In current automobile use, cars get from 15 to 60 miles per gallon gasoline depending upon the size or type of vehicles. At $3.00 per gallon, the cost per mile is $0.05 to 0.20 per mile. If 1 gallon of gasoline contains 36 kW-hr, gasoline fuel efficiencies consequently range from 0.42 miles/kW-hr (estimated by 15 miles/gallon=15 miles/36 kW-hr) for a low mileage SUV to 1.67 miles/kW-hr (estimated by 60 miles/gallon=60/36 kW-hr) for high efficiency hybrid, with an average vehicle having about 0.75 miles/kW-hr.

The cellulose reactions 2a and 2b of the present invention may have several unique features for automotive applications. First of all, by utilizing the waste heat from the engine to heat up the reaction chamber for hydrogen production, it may potentially recapture the energy of 487 kJ/mol that is the heat used to form water vapor at 400° C. and to heat cellulose as discussed above. This may improve the energy output by 17% that is equal to (487 kJ/mol)/(2902 kJ/mol).

Furthermore, the water vapor generated from hydrogen burn in reaction 2b may be re-circulated into the hydrogen generation chamber so that the water usage would only be the initial one to start the cellulose process. As shown in reactions 2a and 2b, 12 moles of water are released from each mole of cellulose converted. If the water from reaction 2b is reused without any loss, 5 net moles of water are created from cellulose in reactions 2a and 2b. By proper use and capture of the generated water from Reaction 2b, no net water is needed in sustaining the cellulose reaction process. This may eliminate an initial concern that the weight of 126 g (7 moles) of water for 162 g (1 mole) of cellulose in Reaction 2a would be an additional burden to the automobiles.

Additionally, the system for conversion of cellulose into hydrogen for power generation may reduce the production of carbon dioxide generation, when compared to the use of gasoline. This may help with easing the concern of global warming issue. For 1 mile per kW-hr as discussed earlier on, the carbon dioxide release in reaction 2a for one mole of cellulose may be estimated by:

(6×44 g $CO_2$)/(12×2 g $H_2$)=11 g $CO_2$/g $H_2$ (11 kg $CO_2$/kg $H_2$)/(33.6 kW-hr/kg $H_2$)/(1 mile/kW-hr)=0.33 kg $CO_2$/mile In contrast, gasoline releases about 9 kg carbon dioxide per gallon. If a car gets 28 miles/gallon gasoline, the carbon dioxide release from 1 mole of cellulose is equal to:

28 miles/gallon×0.33 kg $CO_2$/mile=9.24 kg $CO_2$/gallon

This is approximately equivalent to that released from gasoline. However, the cellulose process is renewable. If it is possible to achieve 5 miles/kW-hr $H_2$ that is 5 times of the conservative estimation of 1 mile/kW-hr $H_2$, then the hydrogen burn would be the equivalent to 5×28=140 miles/gallon gasoline equivalent release of carbon dioxide. Therefore, relatively less carbon dioxide may be produced from hydrogen burn.

To predict whether it is possible to use corn as a source of cellulose, an estimation is done as follows: A typical acre of Iowa farmland grows about 10,000 kg of cellulose and kernel corn. Using Reaction 2a, this 10,000 kg of corn produces 1900 kg of hydrogen or 76 MW-hr of heat that is 23 MW-hr of electrical power at 30% efficiency.

Next, let us determine how effective this may be for automobile uses. It is known that 243 million private automobiles drove 1660 billion miles in 2005. To replace all of the gasoline usages, it may require 49 billion kg of hydrogen. If the production of hydrogen is at 1900 kg $H_2$/acre, a 26 million acres of corn field is needed to provide the gasoline usages in U.S.A., that is a farmland of 200 miles square for production of corn. To replace 10% of the fuel used in U.S.A., it may require a corn field of 64 miles square.

In a broader scope, the world power consumption is 15 TW. The total annual energy consumption is 15 TW×8760 hr=131,400 TW-hr. This would require:

$$(131{,}400\times10^{12}\text{ W-hr})/(33{,}600\text{ W-hr/kg H}_2)=3.9\times10^{12}\text{ kg H}_2$$

This in turn would demand a corn field of 3.125 million square miles as calculated by:

$$(3.9\times10^{12}\text{ kg H}_2)/(1900\text{ kg H}_2/\text{acre})=2\text{ billion acres}=3.125\text{ million square miles}.$$

A land of 3.125 million square miles represents 5.4% of the total world land area. With higher efficiencies, this area may be reduced to 1% of the total world land area. It is also possible that lower conversion efficiencies may move the numbers higher.

In addition to using corn as a source of cellulose, paper may be another source of cellulose. Currently, U.S.A. uses approximately 100 billion kg of paper annually. This quantity may be sufficient to supply all of the private automotive usages if the automotives get 3 miles/kW-hr.

Other Potential Applications

The process for conversion of cellulose into hydrogen may enhance the recycling of cellulose products and turn cellulose waste into power generation. For instance, the waste of cellulose includes forest floors that currently are not economical to recover, but present a serious fire hazard. If it becomes economical to recycle the cellulose waste through the use of the present invention, the hazard problem may be reduced. Other cellulose waste that currently ends up in the land fills may also be utilized through recycling.

What is claimed is:

1. A method for generating electrical power or heat from a compound comprising carbon, oxygen, and hydrogen, the method comprising:
    combining water with the compound to produce a wet form of the compound;
    transferring the wet form of the compound into a reaction processing chamber;
    heating the wet form of the compound within the reaction chamber such that elements comprised by the wet form of the compound dissociate and react through a non-oxidation reaction, wherein one reaction product comprises hydrogen gas; and
    processing the hydrogen gas to generate electrical power or heat.

2. The method recited in claim 1 wherein the compound consists of carbon, oxygen, and hydrogen.

3. The method recited in claim 1 wherein the compound comprises cellulose.

4. The method recited in claim 1 wherein the compound comprises lignin.

5. The method recited in claim 1 further comprising providing a flow of an inert gas to the reaction chamber.

6. The method recited in claim 5 wherein the inert gas comprises argon or nitrogen.

7. The method recited in claim 1 wherein processing the hydrogen gas comprises burning the hydrogen gas.

8. The method recited in claim 1 wherein processing the hydrogen gas comprises feeding the hydrogen gas into a fuel cell.

9. The method recited in claim 1 wherein the water comprises liquid water.

10. The method recited in claim 1 wherein processing the hydrogen gas comprises passing reaction-product gases through a reduced pressure chamber to remove traces of unreacted carbon.

11. The method recited in claim 1 wherein processing the hydrogen gas comprises passing reaction-product gases through a water-cooled chamber to remove unreacted water.

12. The method recited in claim 1 wherein heating the wet form of the compound comprises heating the wet form of the compound to a temperature between 700° C. and 1100° C.

13. A method for generating electrical power or heat comprising:
    heating a wet compound, the compound comprising carbon, oxygen, and hydrogen, such that elements comprised from the wet compound dissociate and react through a non-oxidation reaction to form at least hydrogen gas; and
    processing the hydrogen gas to generate the electrical power or heat.

14. The method recited in claim 13 wherein the compound consists of carbon, oxygen, and hydrogen.

15. The method recited in claim 13 wherein the compound comprises cellulose.

16. The method recited in claim 13 wherein the compound comprises lignin.

17. The method recited in claim 13 wherein processing the hydrogen gas comprises burning the hydrogen gas.

18. The method recited in claim 13 wherein processing the hydrogen gas comprises feeding the hydrogen gas into a fuel cell.

19. The method recited in claim 1 wherein the compound comprises cellulose waste.

20. The method recited in claim 13 wherein the compound comprises cellulose waste.

21. A method for extracting hydrogen from a compound, the method comprising:
    combining water with the compound, the compound comprising carbon, oxygen, and hydrogen, to form a wet compound;
    heating the wet compound such that elements comprised from the wet compound dissociate and react through a non-oxidation reaction to form at least hydrogen gas and carbon dioxide gas; and
    separating the hydrogen gas from the carbon dioxide gas.

22. The method of claim 21, further comprising processing the hydrogen gas to improve automotive engine efficiency.

23. The method of claim 21, further comprising processing the hydrogen to generate electrical power or heat.

* * * * *